Patented Feb. 8, 1944

2,340,989

UNITED STATES PATENT OFFICE 2,340,989

BEVERAGE CONCENTRATE

Bernard Salkin, New York, N. Y.

No Drawing. Application October 30, 1941, Serial No. 417,111

7 Claims. (Cl. 99—71)

Among the objects of the present invention are to provide a concentrate which may be converted into a complete coffee beverage or coffee substitute beverage, substantially instantly, by the mere addition of water thereto at the desired temperature hot or cold.

As conducive to a clear understanding of the invention, it is noted that where coffee, milk and sugar are combined in the form of solid blocks or pellets, to be dissolved in hot water for the preparation of a coffee drink, difficulty has arisen, (1) due to the fact that certain of the solid ingredients do not readily enter into solution, (2) the coffee grounds are not sufficiently concentrated to impart the desired strength to the beverage and leave an insoluble residue; (3) the dried proteins of the lactic ingredient do not revert to the original condition and taste of fresh milk, and under certain conditions are apt to become insoluble; (4) such lactic ingredient is apt to spoil if the pellets are not used promptly; and (5) an excessive amount of sugar is usually required, which renders the product too sweet to meet the taste of many persons.

The present invention seeks to provide a thoroughly practical extract by which a coffee beverage or a coffee substitute beverage may be instantly prepared by the mere addition of water, hot or cold, and which extract shall be so concentrated, that when used in only small quantities, will produce a beverage of desired strength, and which is further characterized by keeping indefinitely without spoilage of the lactic or the coffee ingredients thereof, and to afford a rich and superior flavor no matter what quality of coffee is used as the base.

While especially useful for campers, soldiers in barracks or on the march, or even on the field of battle, or for sailors on ships or those on long voyages, or for consumption in tropical climates, the invention is also of high utility for home use, and is even economical and useful for the restaurant and for the hotel trade. The invention dispenses with the need of percolators or other complicated coffee making apparatus or machines and for separate containers for coffee, sugar and milk or cream. The extract, including as it does milk or cream and sugar, together with coffee extract, takes up no more space than would the ground coffee ingredient alone, as used in conventional practice.

According to the invention, the extract is in a homogeneous, syrupy, or viscous form, which incorporates the coffee, the lactic and the sweetening or sugar ingredients as well as additional flavoring in addition to vitamine extracts or preparations, and preservatives, if desired. The mixture may be homogenized before, during, or after the preparation and concentration thereof, in order to increase the dispersion of the fat particles, and to give a more uniform product which will not only dissolve better, but will have an improved flavor.

The coffee extract used in the mixture may be with, or without additions of coffee substitute or it may be entirely of coffee substitute such as chicory, cereal or soy bean preparations, or of preparations used as beverages, similar to coffee substitutes such as "Postum," "Kaffee Hag," substantially decaffeinized coffee, "Ovaltine," and the like.

In the claims the term "coffee" is intended to embrace within its scope, the various substitutes or additions of the character just enumerated.

If desired, the extract or preparation may be fortified by means of dried coffee extract or a concentrated coffee essence. A solution of the essential ingredients of coffee may be produced by either cold or hot percolation, by boiling, by steeping, or by the drip method, and then separated from the grounds, if any, and either filtered or not, as desired, and finally largely dehydrated to yield the desired concentrate.

The lactic ingredient may consist of cream, whole or skimmed milk, either condensed, evaporated or powdered. If desired, liquid milk, or cream may be used, fortified with milk or cream powder. The milk or cream powder may be prepared by spray drying, drum drying, or by any other process.

Preferably sugar is used as the sweetening agent either in the form of sucrose or a mixture of sucrose with other sugars, such as may be obtained from suspensions or solutions of starch, sucrose or related substances which yield sugars, dextrines or similar products on inversion or hydrolysis. The sugar may be added in the form of solids or syrups, of various specific gravities or viscosities. Saccharine or similar sweeting agents, or malt syrups may be used instead of, or in addition to sugar.

The preservative, the addition of which is optional, may consist of glycerine, if desired. The latter serves to increase the fluidity of the mixture as well as its keeping qualities, acting as it does, as a preservative.

Vitamine extracts and preparations may be added to improve the product, and flavoring agents such as essential oils, natural or synthetic essences of coffee, or some of the ingredients obtained during concentration of the products may also be added.

The various ingredients of coffee extract, lactic constituent and sugar may be separately prepared and mixed in any way to produce the syrupy composition of the present invention. The other ingredients may be admixed therewith originally or they may be added subsequently.

In one desirable process for preparing the extract according to the present invention, the various ingredients, including the coffee, milk and sugar are admixed in desired proportions originally, as in the preparation of a batch of coffee, or rather café au lait, to be served in cups. The mixture is then evaporated, preferably in a vacuum, to a thick syrupy consistency. Thereupon the product is homogenized. This homogenizing step may be performed, if desired, in the course of, and before completion or even before commencement of the vacuum treatment.

To the product as prepared there may then be added essential oils and extracts, and the like, to enhance the flavor and aroma thereof. Among such extracts may be a concentrate of the coffee as obtained in the beginning of the distillation of the water from coffee extract or other forms of concentrated coffee essence may be added.

If desired, the coffee extract may first be concentrated and thereupon milk or cream and sugar and preservative or flavoring extracts may be added to complete the composition. Or the concentration of the coffee and one or more of the other ingredients may be effected conjointly and the additional ingredients may be added subsequently.

In another procedure of preparing the concentrate, dried coffee extract, or so-called soluble coffee or soluble coffee substitute is first dissolved in evaporated milk, then the other ingredients, including sugar, may be added and the whole homogenized.

The vacuum treatment in the process involving the concentration of café au lait may be continued, until a dry residue is obtained which may thereupon be powdered. Alternatively, the original fluid may be spray-dried directly, or the thick syrup yielded by the vacuum treatment may be dried in any manner known to those skilled in the art as, for instance, by spray drying or by drum drying, with or without vacuum. The powdered product is homogenized in the sense that each particle contains coffee, lactic ingredient and sugar in the same proportions as in the original fluid. As contrasted with a powder containing a mechanical mixture of such dry ingredients, the present invention has important advantages. Among these are complete solubility of the lactic and of the coffee ingredient and assurance of uniformity, since no gravitational separation of the individual ingredients can occur in the powder of the present invention.

The syrupy concentrate or the powder, when properly kept in glass jars, cans or paper containers, will last indefinitely in all climates without the spoilage to which the lactic ingredient would otherwise be subject. The coffee extract or coffee substitute extract also keeps its freshness of flavor indefinitely, so that when the water is added to the concentrate, the resultant fluid has substantially the taste and aroma of the freshly prepared product made from the conventional ingredients, but the flavor is greatly enriched.

Powdered milk, especially powdered whole milk, tends to spoil, especially when exposed to air. The product becomes offensive in odor and in taste. However, when incorporated as an ingredient in the syrupy concentrate or the powder of the present invention, it will keep indefinitely.

Where a powdered coffee preparation is used, the addition of a moderate amount of milk and cream, frequently results in a so-called "break," in which the lactic proteins apparently curdle and tend to settle out, a condition which is somewhat remedied by the addition of a greater quantity of milk or cream than meets the taste of consumers generally. According to the present invention, the lactic ingredient even though used in normal quantity, does not have the above-named disadvantage, and a uniform beverage always results on adding water.

Powdered milk or cream without being specially processed, does not give the same results as the fluid lactic product, since the powdered material is not readily soluble in very hot water, which even tends to render the lactic product insoluble. However, when used in the concentrate of the present invention, it is uniformly dispersed throughout the concentrate, and the other ingredients aid the solution of the lactic ingredient.

Moreover, in the syrupy embodiment of my concentrate, where the lactic ingredient is not dehydrated completely, the other ingredients tend to preserve the exact nature of the original lactic product, so that on addition of water, the milk or cream is recreated in substantially its original form.

Another advantage of the present concentrate, is that the various ingredients including the amount of sugar may be in proportion to suit the average taste and the great excess of sugar generally required for pellets that include coffee and milk is avoided.

Since the various ingredients making up the concentrate of the present invention are in proper proportions, there is economy in that the spoilage of milk or cream in opened, or even in unused containers, is obviated.

As many changes could be made in the above concentrate and process, and many apparently widely different embodiments of this invention could be made without departing from the scope of the claims, it is intended that all matter contained in the above description shall be interpreted as illustrative only and not in a limiting sense.

Having thus described my invention, what I claim as new and desire to secure by Letters Patent of the United States is:

1. A viscid fluid concentrate which may be converted into coffee beverage by the mere addition of water thereto, which comprises a homogenized mixture of coffee extract, milk and sugar.

2. The process of preparing an extract from which a coffee beverage may be made by the mere addition of water thereto, which consists in admixing various ingredients including coffee extract, milk and sugar making up a batch of coffee beverage and evaporating the same under vacuum to a syrup-like consistency and homogenizing the resultant product.

3. The process of preparing an extract from which a coffee beverage may be made by the mere addition of water thereto, which consists in admixing various ingredients including coffee extract, milk and sugar making up a batch of coffee beverage, and evaporating the same under vacuum, to remove substantially all water there-from, homogenizing the mixture prior to completion of the evaporation, and after completion of the evaporation, reducing the residue to a powder.

4. The process of preparing an extract from which a coffee beverage may be made by the mere addition of water thereto, which consists in admixing various ingredients including coffee extract, milk and sugar making up a batch of coffee beverage, evaporating the same under vacuum to a syrup-like consistency, homogenizing the resultant product, and then adding to the resultant product concentrated coffee essence and essential oils, and extracts.

5. The process of preparing a fluid concentrate which, by the mere addition of water thereto may be converted into a coffee beverage, which consists in preparing a batch of coffee beverage, which includes coffee, milk and sugar, evaporating the same in a vacuum and homogenizing the same in the course of the vacuum treatment.

6. The process of preparing a coffee extract which, by the mere addition of water thereto may be converted into coffee beverage, which consists in preparing black coffee percolate in an ordinary manner, concentrating the same by heating to a viscous fluid under vacuum at a relatively low temperature and then admixing the extract with sugar and concentrated lactic ingredient, and finally homogenizing the product.

7. The process of preparing a coffee extract which, by the mere addition of water thereto may be converted into coffee beverage which consists in dissolving dried coffee extract in evaporated milk, adding sugar and homogenizing the product.

BERNARD SALKIN.